(No Model.) 4 Sheets—Sheet 1.
A. C. MATHER.
WATER POWER.
No. 441,183. Patented Nov. 25, 1890.
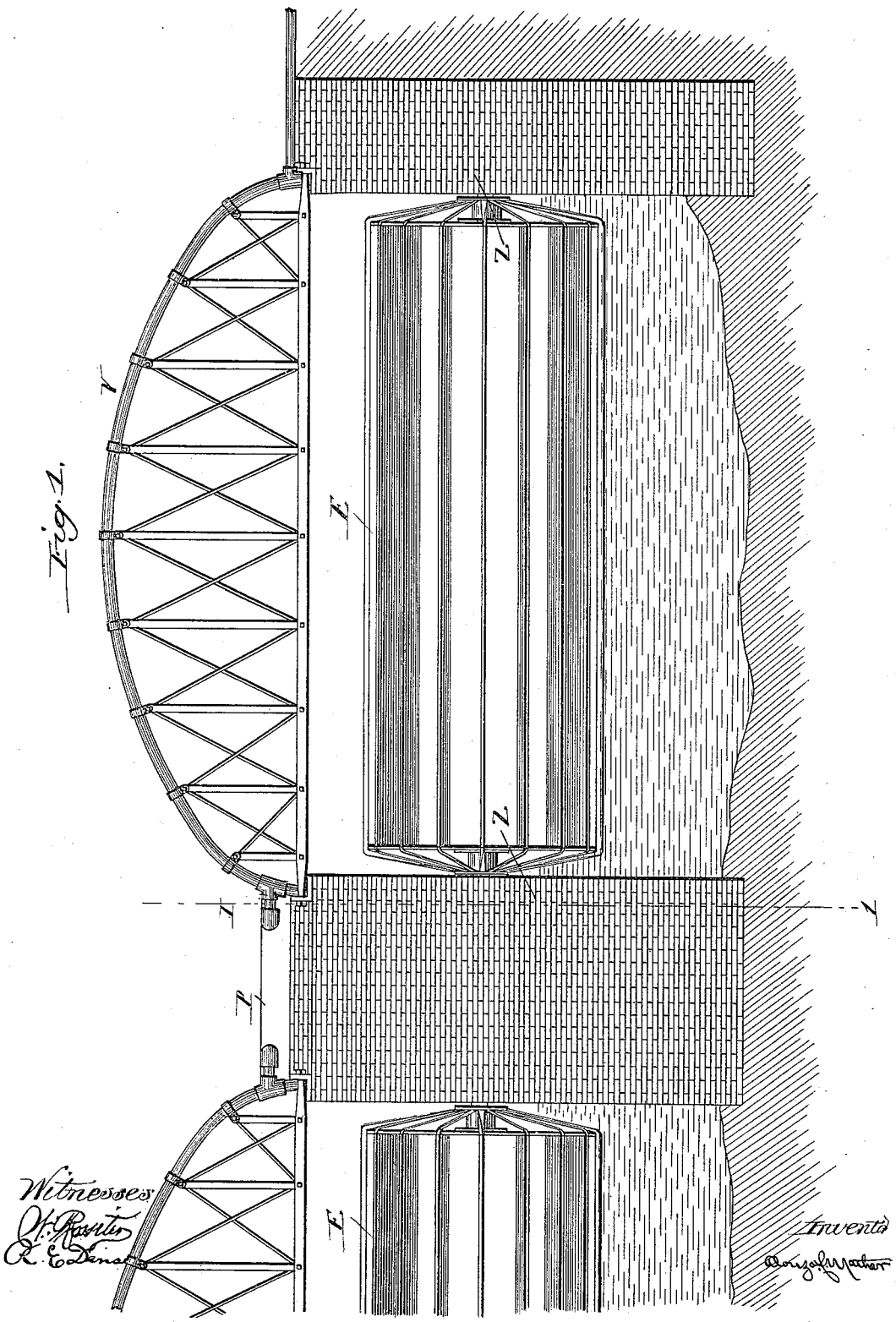

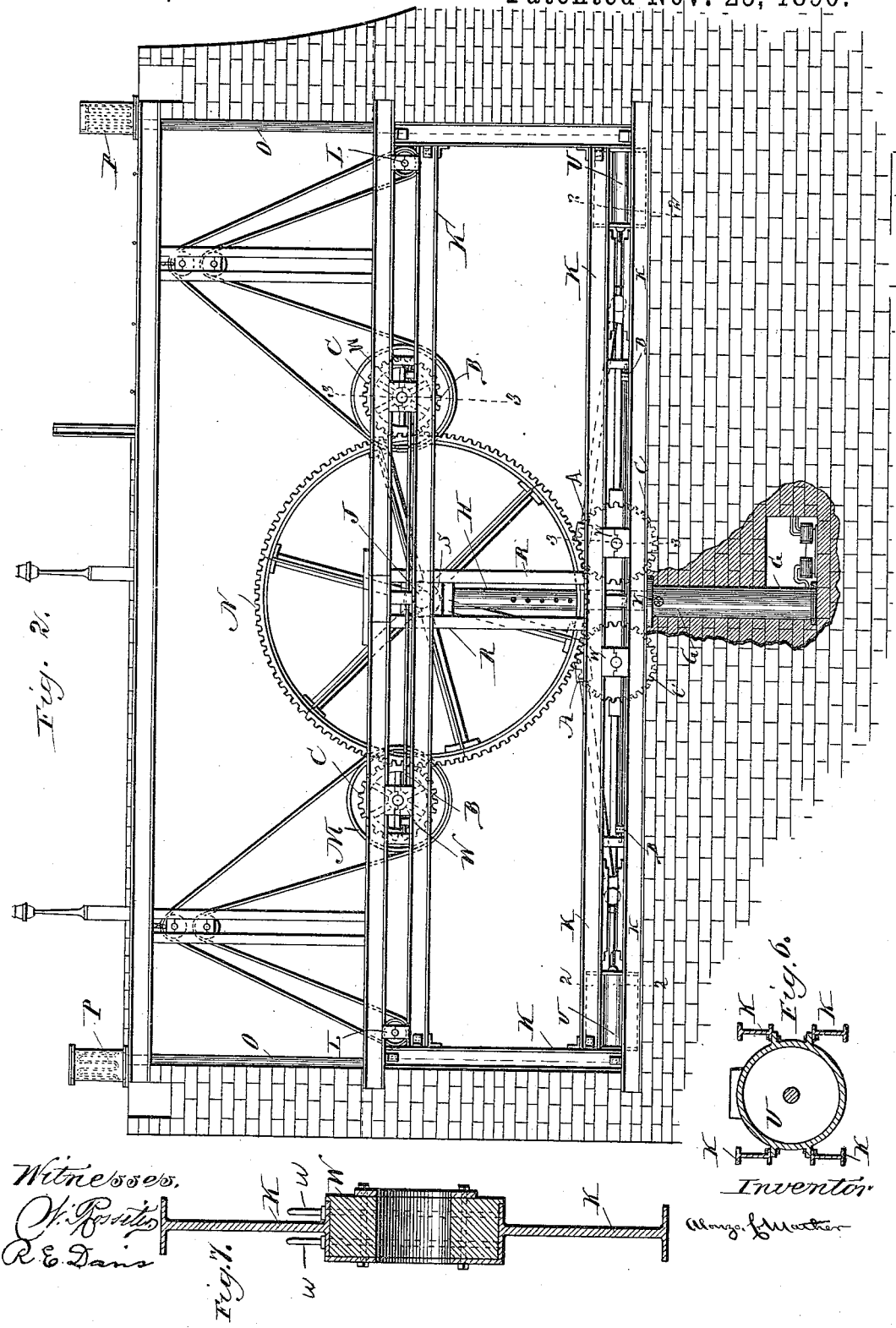

(No Model.) 4 Sheets—Sheet 3.
A. C. MATHER.
WATER POWER.
No. 441,183. Patented Nov. 25, 1890.
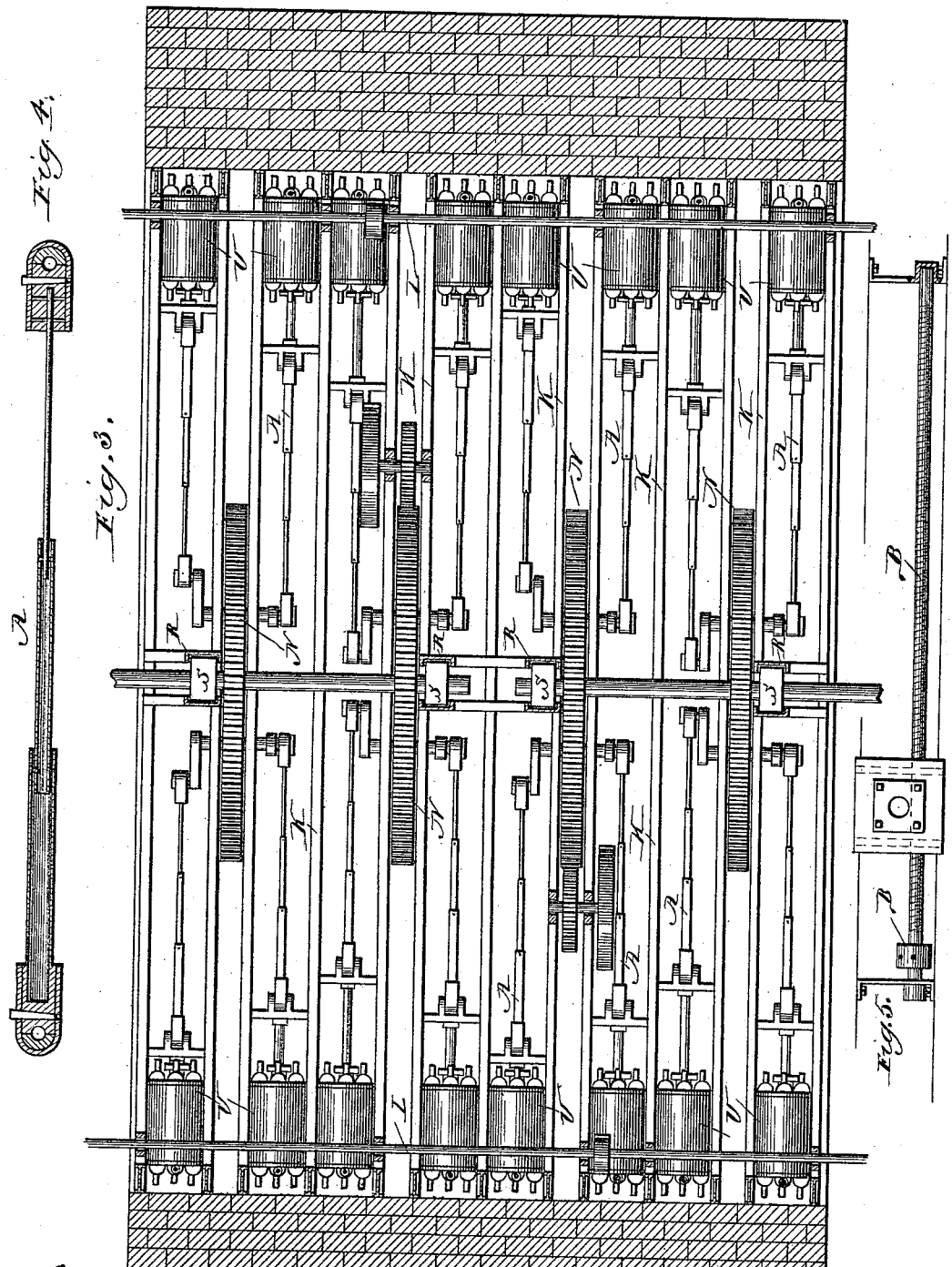

(No Model.) 4 Sheets—Sheet 4.
A. C. MATHER.
WATER POWER.
No. 441,183. Patented Nov. 25, 1890.
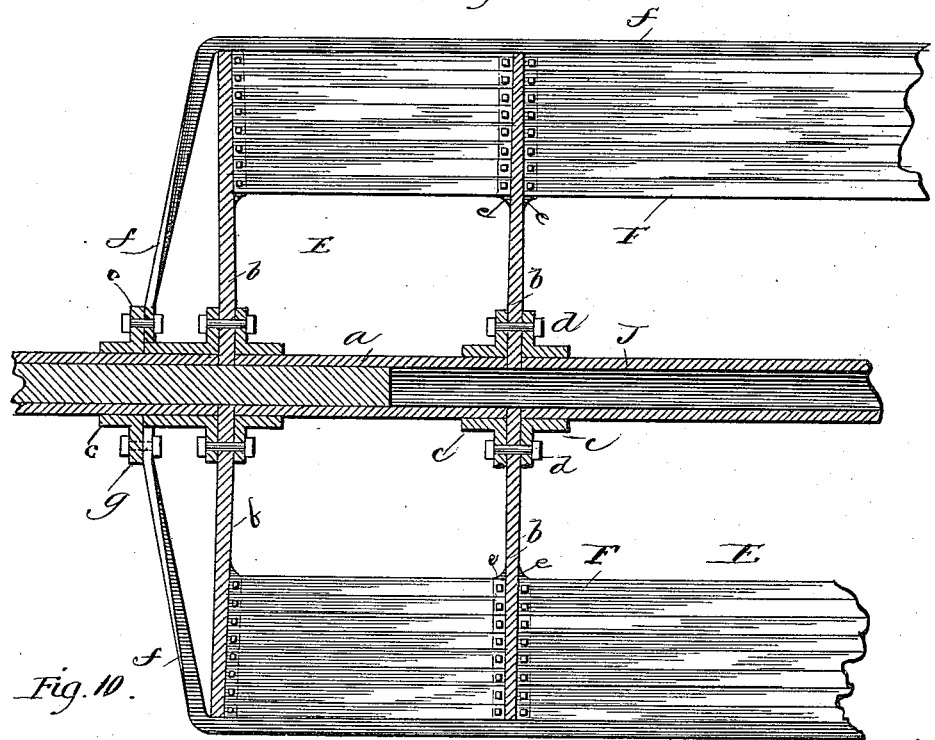
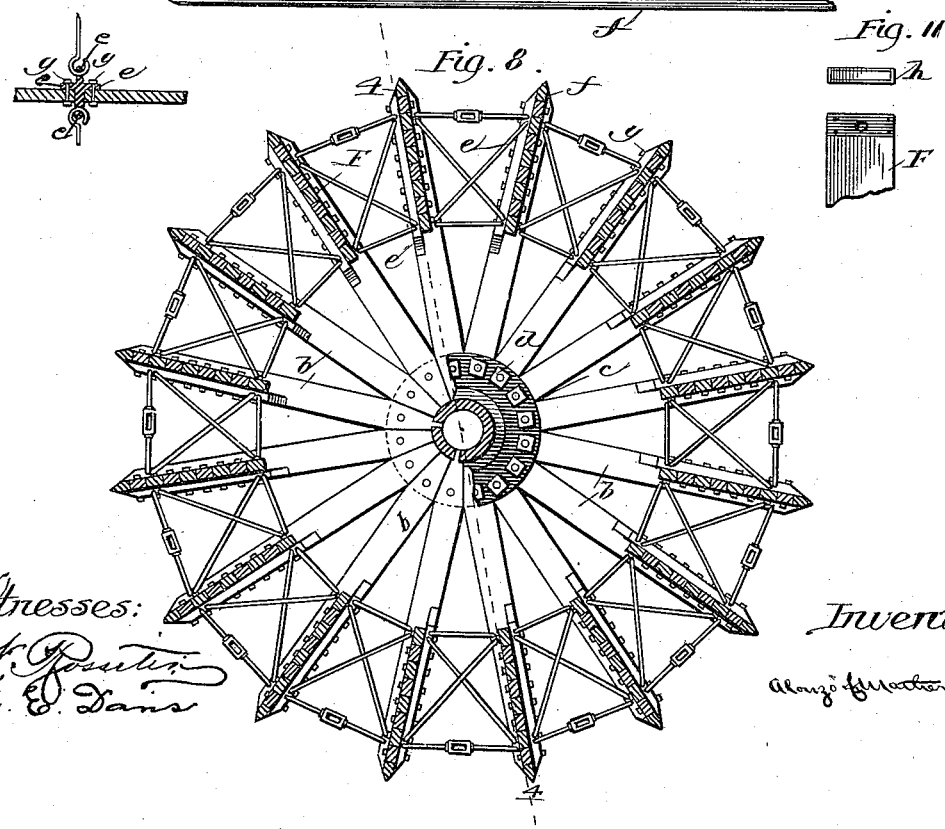
Witnesses:
Inventor:

UNITED STATES PATENT OFFICE.

ALONZO C. MATHER, OF CHICAGO, ILLINOIS.

WATER-POWER.

SPECIFICATION forming part of Letters Patent No. 441,183, dated November 25, 1890.

Application filed June 14, 1889. Serial No. 314,293. (No model.)

*To all whom it may concern:*

Be it known that I, ALONZO C. MATHER, a citizen of the United States, residing at Chicago, in the county of Cook and State of Illinois, have invented certain new and useful Improvements in Water-Power, of which the following is a specification.

The object of my invention is to utilize the power of large and comparatively slow-moving bodies of water, to accomplish which it is necessary, first, to produce a very large long water-wheel so constructed that every part will tend to brace the wheel in a perfectly rigid manner and provided with removable paddles, against which the water exerts its pressure, which can be readily and quickly replaced; second, it is necessary to raise and lower the said wheel quickly, no matter what the length or weight, to provide for the rise and fall of the current and guard against heavy flows of ice; third, on account of the slow but very powerful movement of the wheel and small space in the piers, it is necessary to combine great power-reproducing machinery which can be quickly connected or disconnected with the shaft of the large wheel, according to the force of the current under various circumstances. At the same time it must be so braced that no strain will come upon the pier itself, but be equalized by a strain in opposite directions, which I accomplish with iron eye-beams tied together in such a manner that the spread of the bracing by any thrust or stroke of the piston-rod could not amount to the fractional part of an inch.

It will be seen that I utilize the truss of the bridge for conveying the compressed air as well as to support the bridge, serving a double purpose, and thereby justifying the expense.

In the drawings, Figure 1 is a front view of my invention. Fig. 2 is a side view taken on line 1 1 of Fig. 1. Fig. 3 is a plan view. Fig. 4 is an enlarged view of one of my adjustable connecting-rods A. Fig. 5 is an enlarged view of the screw B, by which I move the boxes or bearings of the small cog-wheels C C. Fig. 6 is a cross-section of one of my air-compressor cylinders, taken on the line 2 2 of Fig. 2. Fig. 7 is a detail of one of my sliding bearings, taken on line 3 3 of Fig. 2. Fig. 8 is an end view of the water-wheel E. Fig. 9 is a section taken on line 4 4 of Fig. 8. Fig. 10 is a detail showing the manner of attaching and supporting my removable paddle-boards F. Fig. 11 is a detail of the end of one of my paddles F, showing the manner in which it is strengthened at the ends.

In the drawings, $a$ is a hollow shaft to give stiffness and lightness, filled solid to a point just beyond where the strain of the bearing and bracing comes.

$b\ b$ are the arms of the wheel, so shaped that they brace one against the other at a point where they rest upon the shaft, every third or fourth one being let into the shaft, all being firmly held in place by collars $c\ c$, and each ray or spoke being held in its place by a separate bolt $d$ passing through it and the collar on the shaft. The outer extremities of the arms $b\ b$ are provided with flanges $e\ e$, against which my removable paddles are bolted. The extreme ends or points of the arms are countersunk, into which I let the iron brace $f$, which is bolted to the collar $g$ near the bearings at each end of the wheel, making a twist near the collar to which they are fastened, and by which the sharp edge is presented at the outer edge of the wheel, thus bracing it in a perfectly rigid manner and protecting the edge of the paddles F, which are also protected on their ends by the band $h$, strengthening them, so the bolt $g'\ g'$ will hold them firmly in their place. (See Fig. 10.)

G is a hydraulic cylinder let into the masonry of the pier.

H is a plunger, which is forced up or down by hydraulic pressure.

J is the main shaft of the water-wheel, resting in the box attached to the plunger H.

K K are eye-beams tied or fastened together, as is clearly indicated in Fig. 2.

L is a shaft connected by a belt to the large pulley-wheel M, the slack of which is taken up in the manner shown.

N is a large cog-wheel upon the shaft of the water-wheel E.

O O are pipes leading from the air-compressors to the reservoir P.

R R are the ways in which the box or bearing S is guided.

It will be seen by reference to Fig. 2 that in the construction of my invention I leave an opening in the center of the pier $z\ z$ between the trusses V, across the bottom of which I lay eye-beams K K, having securely attached to each end air-compressors U U, as shown in Fig. 6. In the center and at right angles is the shaft of the large water-wheel, resting in the boxes S S, said boxes resting upon the end of the plunger H, which is raised and lowered by the hydraulic cylinder G. In the space between the eye-beams K K are sliding boxes W W. The trusses V are suitably braced and consist of pipes or tubing adapted to convey compressed air from the several reservoirs P to points where the power is to be utilized.

In operation it will be seen that when the large water-wheel E is set in motion the large cog-wheel N, keyed upon its shaft, will travel slowly and powerfully. This large wheel N meshes with the small cog-wheels C C, the lower set being connected by an adjustable connecting-rod A to the piston-rod of the air-compressors U U and the upper set by a belt to the shaft L, by which I am enabled to obtain a high speed for dynamos in the upper story and proper speed for working the air-compressors in the lower. The air-compressors U U being attached to the extreme ends of the eye-beams K K and working in opposite directions, the pressure by the stroke in one direction is equalized by that in the other. In order to raise or lower the water-wheel E, I first screw or unscrew the long screw B, so as to throw the upper set of cog-wheels out of gear. I then raise the main shaft by the hydraulic cylinder G just sufficient to throw it out of gear with the lower set of cog-wheels C C. I then by means of the screw B and adjustable connecting-rod A put them in the position desired, dropping a pin $w$, Fig. 7, through the flange on the eye-beams as well as through the boxes W W, which slide between them, firmly locking the bearings of the lower set of cog-wheels in the place desired. I then lower the main shaft until the large wheel meshes into the lower set of cog-wheels. I then screw my set-screw Y well into the plunger or piston-rod of the hydraulic cylinder, which locks it in place. It will be thus seen that I am enabled to raise or lower my water-wheel at will at a distance of ten or fifteen feet and secure it at any point desired and immediately throw the wheel which works my air-compressor and electric dynamo in engagement with it. It will also be seen that by my construction I am enabled to utilize the parts of the bridge for two purposes without additional cost, the trusses which serve to support the bridge acting also as conductors of the compressed air, and thereby the provision of additional pipes or conductors for this purpose is unnecessary.

Having thus described my invention, what I claim is—

1. The combination, with a water-wheel supported and turning between two piers, of hydraulic cylinders mounted in the piers and having plungers connected to the shaft of said wheel and moving in said cylinders, whereby the wheel may be supported and elevated by the cylinders at each end, substantially as described.

2. The combination, with the piers, of a water-wheel adjustably supported between the piers, air-compressors mounted on the piers, and adjustable connections between the air-compressors and the wheel, whereby the compressors may be operated by the wheel adjusted at various heights, substantially as described.

3. The combination, with the piers, of a water-wheel adjustably supported between the piers, a driving-gear connected with the water-wheel, beams mounted in the piers, and gears adjustably mounted on the beams, whereby the gears may be adjusted to engage with the gears on the water-wheel at various heights of the wheel, substantially as described.

4. The combination, with a water-wheel adjustably supported between two piers, of the beams K K, the air-compressors attached to the ends of said beams, the cog-wheel N on the water-wheel shaft, the cog-wheels C C, meshing with the cog-wheel N and mounted in boxes adjustably supported between the beams K K, and means for connecting the cog-wheels C C with the air-compressors, substantially as described.

5. The combination, with a water-wheel adjustably supported between two piers and provided with a cog-wheel N, of the beams K K, the boxes W W, adjustably supported between said beams, the screw B, for adjusting said boxes, and the cog-wheels C C, mounted in said boxes and adapted to mesh with the cog-wheel N, substantially as described.

6. The combination, in a water-power wheel, of the shaft J, the arms $b$ $b$, resting upon and engaged with said shaft, the flanged collars $c$, surrounding the shaft on each side of said arms, the bolts $d$ $d$, passed through said collars and arms, and the braces $f$, engaged with the outer ends of the arms $b$ and secured to the shaft J at both ends of the water-wheel, substantially as described.

7. The combination, in a water-power wheel, of the shaft J, having arms $b$, provided at their outer ends with the four flanges $e$, the paddles and cross-braces secured to said flanges, and the longitudinal brace-straps $f$, engaged with the outer ends of the arms $b$ and secured to the shaft J at both ends of the water-wheel, substantially as described.

ALONZO C. MATHER.

Witnesses:
J. B. ALEXANDER,
R. E. DAVIS.